US012811930B2

(12) United States Patent
Berg

(10) Patent No.: US 12,811,930 B2
(45) Date of Patent: Nov. 24, 2026

(54) METHOD AND SYSTEM FOR PROVIDING A TRUST RELATIONSHIP BETWEEN ENTITIES

(71) Applicants: DENSO International America, Inc., Southfield, MI (US); DENSO CORPORATION, Kariya-city (JP)

(72) Inventor: Jeffrey Berg, Birmingham, MI (US)

(73) Assignees: DENSO International America, Inc., Southfield, MI (US); DENSO CORPORATION, Kariya-city (JP)

( * ) Notice: Subject to any disclaimer, the term of this patent is extended or adjusted under 35 U.S.C. 154(b) by 17 days.

(21) Appl. No.: 18/891,107

(22) Filed: Sep. 20, 2024

(65) Prior Publication Data

US 2026/0089156 A1 Mar. 26, 2026

(51) Int. Cl.
*H04L 9/40* (2022.01)

(52) U.S. Cl.
CPC ................................ *H04L 63/0869* (2013.01)

(58) Field of Classification Search
CPC .................................................. H04L 63/0869
See application file for complete search history.

(56) References Cited

U.S. PATENT DOCUMENTS

| | | | | |
|---|---|---|---|---|
| 8,941,465 | B2 | 1/2015 | Pineau et al. | |
| 9,832,026 | B2 * | 11/2017 | Kravitz | H04W 12/50 |
| 11,456,882 | B2 | 9/2022 | Kravitz et al. | |
| 2016/0212103 | A1 * | 7/2016 | Rhoads | H04L 63/0869 |
| 2018/0234256 | A1 * | 8/2018 | Bowen | H04L 63/0823 |
| 2018/0287803 | A1 * | 10/2018 | Barry | H04L 9/3263 |
| 2020/0127821 | A1 * | 4/2020 | Dolev | H04L 9/0861 |
| 2020/0302047 | A1 * | 9/2020 | Falk | H04W 12/069 |
| 2020/0304318 | A1 * | 9/2020 | Kravitz | H04L 9/3268 |
| 2022/0070666 | A1 * | 3/2022 | Hua | H04L 9/3271 |
| 2022/0231863 | A1 * | 7/2022 | Agarwal | H04L 63/126 |
| 2022/0329570 | A1 * | 10/2022 | Sharma | H04L 63/04 |
| 2023/0396417 | A1 * | 12/2023 | Junk | H04L 9/3247 |
| 2024/0127234 | A1 * | 4/2024 | Madisetti | H04L 63/061 |
| 2025/0065843 | A1 * | 2/2025 | Bu | H04W 4/40 |

FOREIGN PATENT DOCUMENTS

| | | |
|---|---|---|
| JP | 2002-139998 A | 5/2002 |

* cited by examiner

*Primary Examiner* — Noura Zoubair
*Assistant Examiner* — Afaq Ali
(74) *Attorney, Agent, or Firm* — Harness, Dickey & Pierce, P.L.C.

(57) ABSTRACT

A method and system include a root authority providing a first proof of identity. First and second entities store the first and second proof of identities, respectively. The root authority generates a first proof of relationship between the first entity and the second entity or between the first entity and a first group or role/The first entity stores the first proof of relationship. The first entity communicates the first proof of identity and first proof of relationship or role as a first communication to the second entity. The second entity confirms the first proof of identity was created by the root authority. The second entity confirms the first proof of relationship or role was created by the root authority. Based on the second entity confirming the first proof of identity and the first proof of relationship, the second entity or the first entity enables a function.

17 Claims, 12 Drawing Sheets

METHOD AND SYSTEM FOR PROVIDING A TRUST RELATIONSHIP BETWEEN ENTITIES

FIELD

The present disclosure relates to enabling actions between entities, and, more specifically, to establishing trust between various entities.

BACKGROUND

This section provides background information related to the present disclosure which is not necessarily prior art.

When entities need to communicate with each other, they do so use a secure protocol. The Car Connectivity Consortium (CCC) is a group that sets standard behind vehicle accessibility for all smart mobile devices. The CCC provides a certificate-based system that establishes a session between entities in order to communicate. In CCC communications, a session is established and a certificated is generated. The certificate is stored at the communicating entities. One problem with such communication is that the process of establishing a session and generating the certificate takes a lot of time and coordination between different server-based logical entities. Time and complexity are especially important considerations in fleets with hundreds or even thousands of vehicles and system users.

SUMMARY

This section provides a general summary of the disclosure and is not a comprehensive disclosure of its full scope or all of its features.

In one aspect of the disclosure, a method and system includes a root authority providing a first proof of identity. First and second entities store the first and second proof of identities, respectively. The root authority generates a first proof of relationship between the first entity and the second entity or between the first entity and a first group or role/ The first entity stores the first proof of relationship. The first entity communicates the first proof of identity and first proof of relationship or role as a first communication to the second entity. The second entity confirms the first proof of identity was created by the root authority. The second entity confirms the first proof of relationship or role was created by the root authority. Based on the second entity confirming the first proof of identity and the first proof of relationship, the second entity or the first entity enables a function.

In another aspect of the disclosure, a method includes generating a first proof of identity at a root authority, storing, at a first entity, the first proof of identity created by the root authority, storing, at a second entity, a second proof of identity created by the root authority, generating, at the root authority, a first proof of relationship between the first entity and the second entity or between the first entity and a first group or role, storing the first proof of relationship at the first entity, communicating from the first entity the first proof of identity and first proof of relationship or role as a first communication to the second entity, confirming, at the second entity, the first proof of identity was created by the root authority, confirming, at the second entity, the first proof of relationship or role was created by the root authority, communicating between the first entity and the second entity based on the second entity confirming the first proof of identity and the first proof of relationship, enabling a function at the first entity and the second entity.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1A:
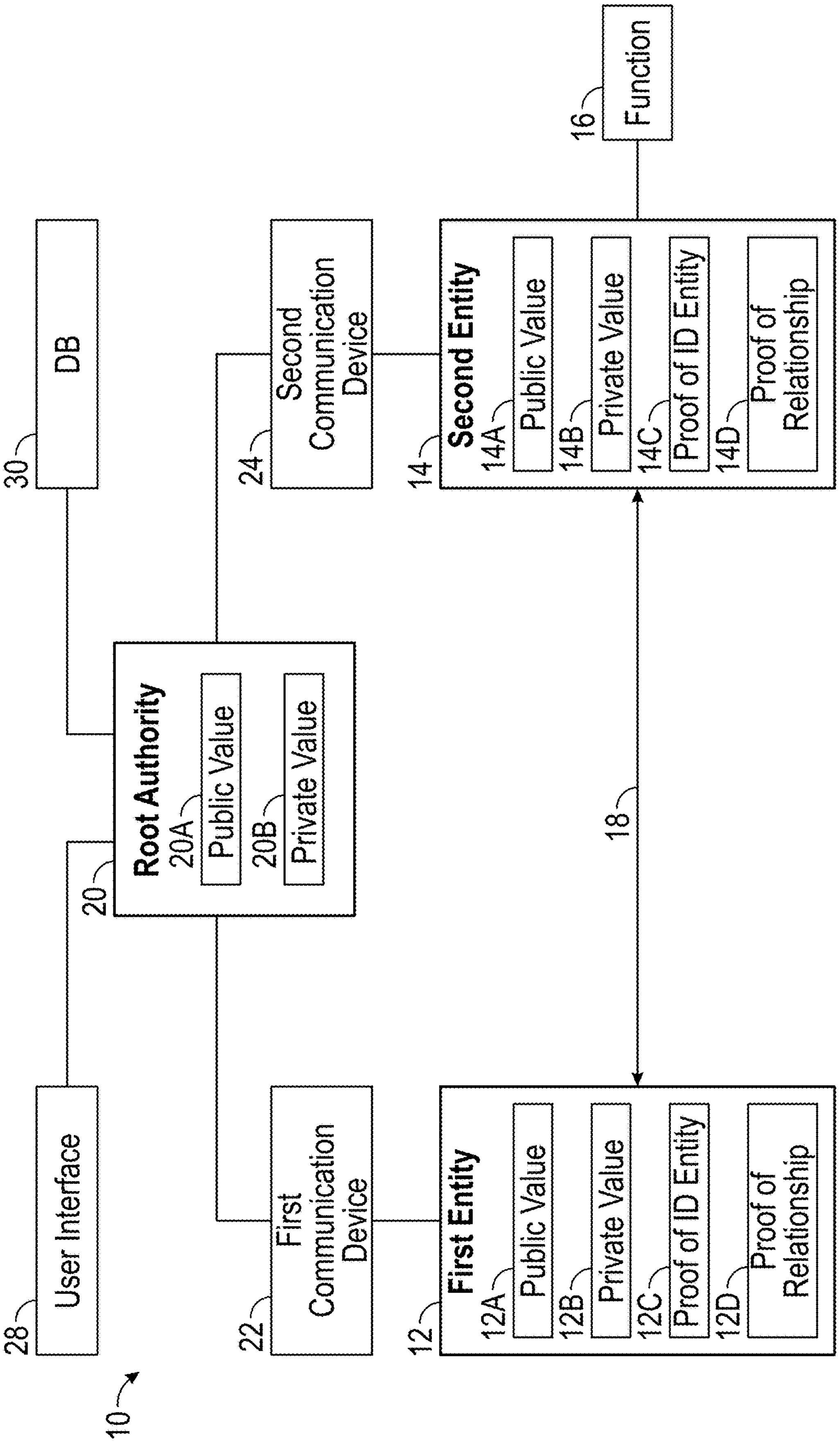
FIG. 1A is a block diagrammatic view of the communication system according to the present disclosure.

Referring now to FIG. 1A, a communication system 10 is used between a first entity 12 and a second entity 14 to allow the first entity 12 to access a function 16 provided by or through the second entity 14. The first entity 12 and the second entity 14 communicate through a network such as but not limited to Bluetooth® low energy (BLE), ethernet, near field communication or the like. In one example, first entity 12 is a mobile device such as a cellular or mobile phone. The second entity 14 may be a vehicle. The function 16, in the case of a phone and a vehicle, may be allowing the vehicle to unlock or start, or a combination thereof.

A root authority 20 may be a server or a certificate authority that is used as a verification source to allow the first entity 12 and the second entity 14 to intercommunicate as described in greater detail below. The following provides one way to prove identity. However, other ways to prove identity may be used including but not limited to a simple token, a username and password which returns a token, and zero knowledge proofs.

The root authority 20 has a public key or root public value 20A and a private key or root private value 20B. The public value 20A may be shared with the first entity 12 and the second entity 14. The private value 20B is used for encryption or decryption of intercommunications with the root authority 20. The private value 20B may also be used to sign certificates or proofs of identity and proofs of relationships such as tokens.

The first entity 12 includes a public value 12A, a private value 12B, a proof of identity 12C and an optional proof of relationship 12D. The second entity 14 includes a public value 14A, a private value 14B, a proof of identity 14C and an optional proof of relationship 14D. The public values 12A, 14A may be implemented in a public key. The private values 12B, 14B may be implemented in a private key. The proof of identity 12C, 14C may be established and signed by the root authority 20 as described in greater detail below. The proof of identities 12C, 14C may be implemented in a certificate. The certificates or proof of identities 12C, 14C may be signed by the root authority to allow a trust to be established between the communications of the first entity 12 and the second entity 14.

The proof of relationship 12D, 14D may be used to establish a relationship or link between the entities and groups or between groups to which the entities 12, 14 belong. The proofs of relationship 12D, 14D may be a list of entities or groups associated with the group. The proofs of relationships 12D, 14D may be periodically updated to include revised memberships, or to renew them after they have expired.

The root authority 20 may communicate with the first entity through a first communication device 22. The root authority 20 may communicate with the second entity 14 through a second communication device 24. The first communication device 22 and the second communication device 24 may also be the same communication device or same type of communication device but physically different devices. The first communication device 22 and the second communication device 24 may be networks, beacons or other types of intermediate storage devices that store values from the root authority 20. That is, the root authority 20 may communicate indirectly with the first entity 12 and the second entity 14. This is in contrast to the CCC type system that relies on direct communication from the root authority to the first entity or a second entity in the exchange of certificates.

The root authority 20 may be associated with a user interface 28. The user interface 28 may be used to input data to the root authority. The user interface 28 may be used to populate a database 30. The database 30 stores various group relationships and membership of various groups as will be described in greater detail below. The proof of relationship or proof of being part of a group may be provided in the proof of relationships 12D, 14D. The proof of relationships may include rules data that allow use (enablement) or restrict use of the different entities such as vehicles.

Figure 1B:
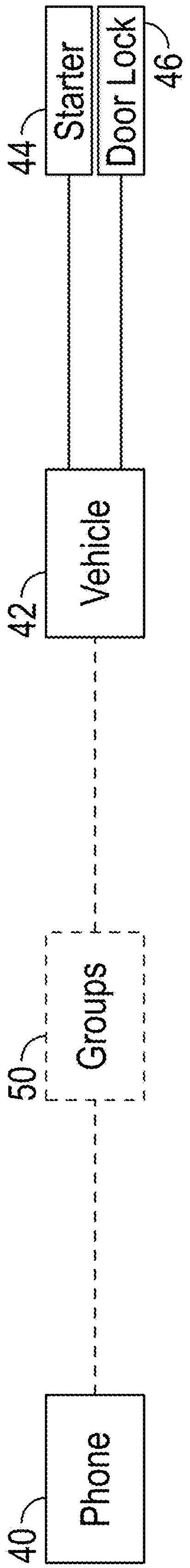
FIG. 1B is a specific example of a block diagrammatic view where the first entity is a mobile phone, and the second entity is a vehicle.

Referring now to FIG. 1B, a specific example of the communication system 10 illustrated above is set forth. In this example, a phone 40 as the first entity is used to communicate with a vehicle 42 as the second entity. The phone 40 and the vehicle 42 may intercommunicate to perform functions at a physical-access device such as a starter function 44 at a starter and a door lock function 46 at an electronic door lock. The membership of the phone 40 and/or the vehicle 42 within one of a plurality of groups 50 may be used to determine the access to particular functions. The formation of the groups 50 and the membership within the groups is described in greater detail below.

Figure 1C:
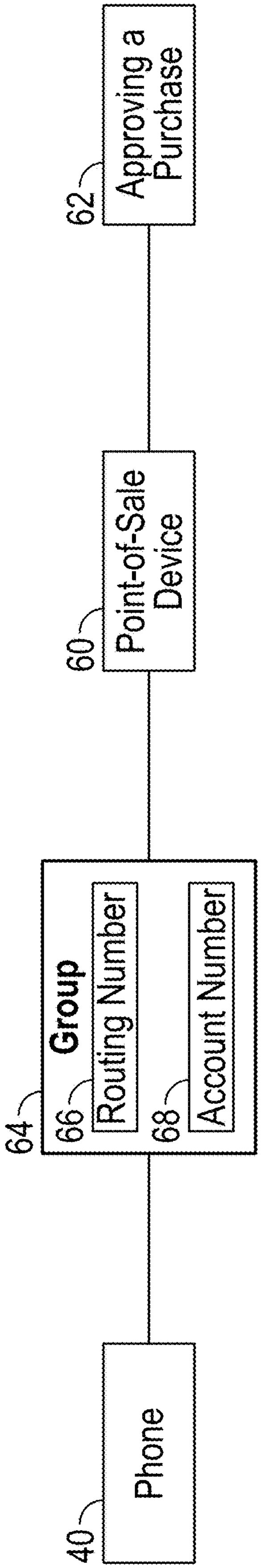
FIG. 1C is a block diagrammatic view where the first entity is a phone, and the second entity is a point of sale device.

Referring now to FIG. 1C, the phone 40 illustrated in FIG. 1B is used together with a point of sale device 60. The point of sale device 60 may be a credit card or a bank access type machine for debiting bank accounts. The point of sale device 60 may enable a function such as approving a purchase 62. In this example, a set of groups 64 may be established. The groups 64 may be a routing number group 66 and an account number group 68. Membership within both groups 66, 68 may allow a phone 40 to be used to ultimately be approved for a purchase 62 and debit the account at the point of sale device 60 in the manner described in greater detail below.

Figure 2:
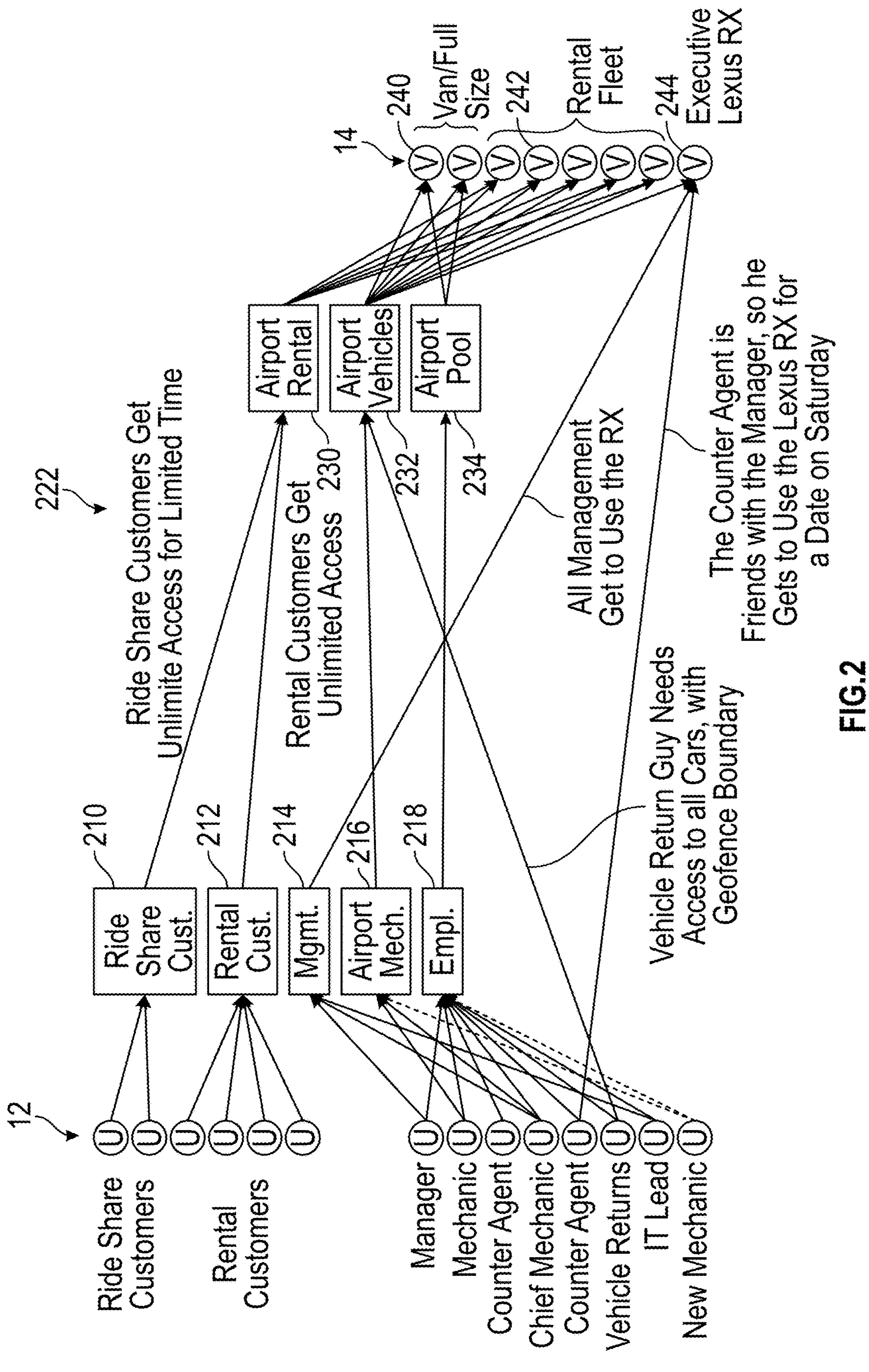
FIG. 2 is a diagrammatic view of entities and the proof of relationships in groups therebetween.

Referring now to FIG. 2, a more complex interrelationship of first entities 12 and second entities 14 are illustrated. The first entities 12 may be part of groups such as a ride share customer group 210, rental customer group 212, a management group 214, an airport mechanic group 216 and an employee group 218. The lower left portion of FIG. 2 includes a first entity with specific titles or statuses, such as manager, mechanic, counteragent, chief mechanic, counteragent, vehicle returns, IT lead and a new mechanic. The ride share customer group 210 and the rental customer group 212 are exclusively in separate groups. The bottom of the FIG. 2 has the first entities of different titles and may be in more than one group. For example, the manager, the chief mechanic and the IT lead may be in the management group 214. The airport mechanic group 216 may have the mechanic, the chief mechanic and the new mechanic therein. The employee group 218 may include all of the first entities at the bottom left including the manager, mechanic, counteragent, chief mechanic, counteragent, vehicle returns, IT lead and new mechanic.

The first entities 12 and the first groups 210-218 may be interlinked with links 220 that may be represented by proofs of relationships as defined in greater detail below.

A separate set of links 222 may link the first group 210-218 to a second group 230-234. In this example, the airport rental group 230, an airport vehicle group 232 and an airport pool group 234 are illustrated. The links 222 between the first set of groups and the second set of groups include the following relationships. The ride share customer group 210 and the rental customers group 212 are in the group 230. The airport mechanic group 216 and the vehicle returns group are in the airport vehicles group 232. The employee group 218 is part of the airport pool group 234.

The second entities 14, in this example, have subgroups. That is, the first two vehicles, in this example, correspond to a full size or van group 240. A second group 242 is the rental fleet group and the group having the last vehicle 244 is an executive Lexus RX. The first two second entities in group 242 are in the airport pool group 234 and the airport vehicle group 232. The next five vehicles are in the airport rental group 230 and the airport vehicle group 232. The last vehicle 244 corresponds to the management group 214 and a counteragent who is friends with the manager so that they may use the Lexus RX in the group having the last vehicle 244 for a special occasion.

The membership of the entities, the groups within a group as well as rules for controlling a function are provided in the proofs of relationships.

Figure 3A:
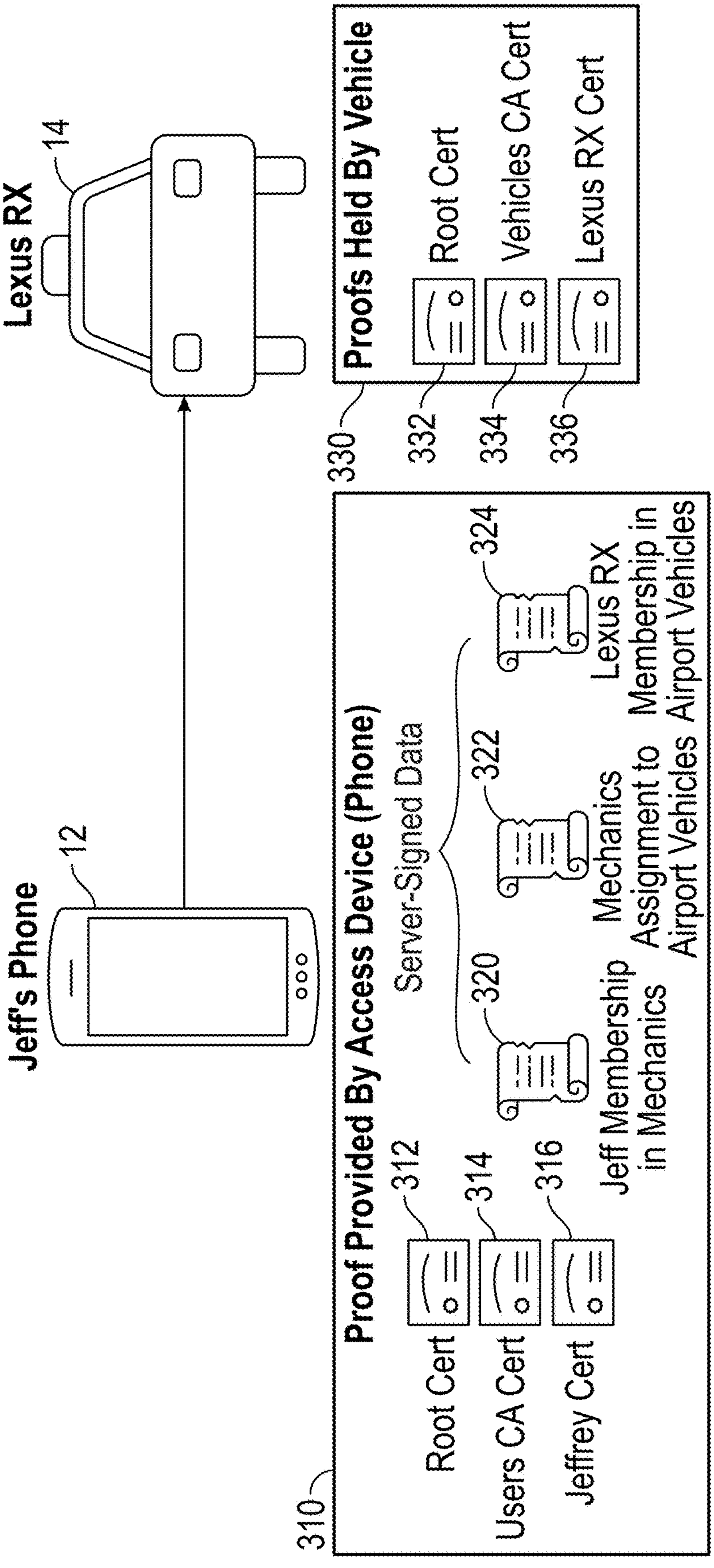
FIG. 3A is a diagrammatic view of proof of relationship and proof of identities within a first entity and proof of entities within a second entity.
Figure 3B:
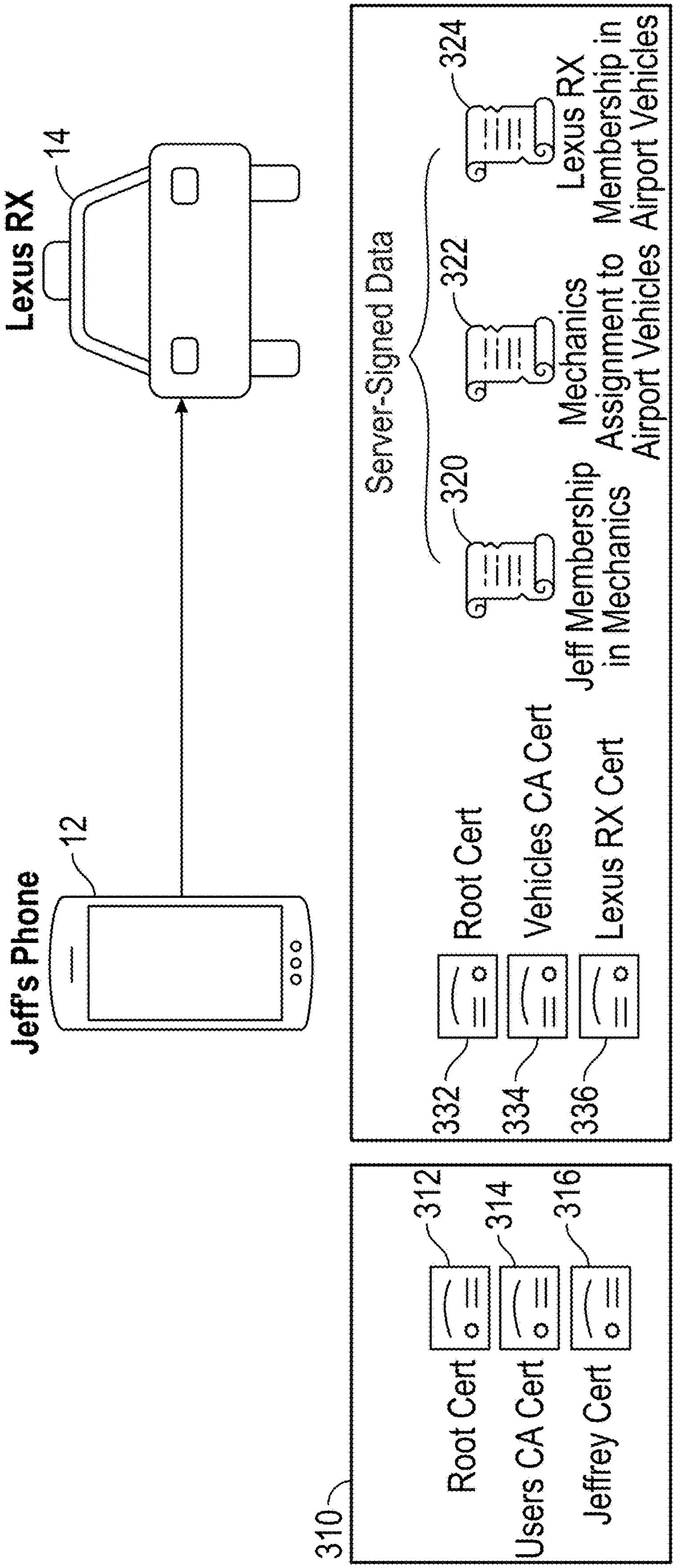
FIG. 3B is a diagrammatic view of proof of identifies in a first entity and a proof of entity and proof of relationships in a second entity.

Referring now to FIGS. 3A and 3B, a specific first entity 12 is illustrated as "Jeff's phone" and the second entity 14 is illustrated specifically as "Lexus RX". Proofs 310 correspond to proofs stored with "Jeff's phone" as the first entity 12. A plurality of proofs of identity 312, 314 and 316 are illustrated. In this example, the first proof of identity is the root certification. A second optional intermediate certification corresponds to a user certification or user proof of identity 314 and is derived from the root certification. The last certification corresponds to a specific user certification or proof of identity 316 which is derived from the intermediate certification. The certifications for proof of identities 312-316 form an unbroken chain from which it can be determined the last proof of identity 316 is authentic as related to the root certification through the intermediary certification.

The first entity 12 also has server signed data that corresponds to a proof of relationship which, in turn, corresponds to membership in the groups 210-218 or 230-234 of FIG. 2. In this example, a first proof of relationship 320 corresponds to "Jeff" being a member of the airport mechanics group 216. The second proof of relationship corresponds to the mechanics being assigned to the airport vehicle group 232. A third proof of relationship 324 corresponds to the Lexus RX vehicle belonging to the airport vehicle group 232. The vehicle proofs 330 may include a first root proof of identity 332, an intermediate certification authority for vehicles 334 and proof of identity for the Lexus RX 336. It should be noted that the proof of identities 312-316 and 332-336 may have an infinite or long period before expiration. Membership within particular groups illustrated by the proof of relationships 320-324 may be short lived and expire on a more regular basis. Various time periods for expiration of the proof of relationships 320-324 may include daily, weekly or monthly, by way of example. However, other time periods may be used. In this manner, the proofs of identities may be relatively static and there is no need to communicate them to the first entity or the second entity often. However, the server signed data in the proof of relationships 320-324 may be communicated to the first entity 12 before they expire. In this manner the composition of the groups may have changed. Further, two sets of proofs of relationships may be provided. For example, the proof of relationships 320-324 may expire after two weeks but new proof of relationships 320-324 may be provided weekly. That way should a connection and update be prevented due to connectivity issues, proof of relationships may be maintained for at least the overlap time period.

Referring now to FIG. 3B, the proofs may be held in the first entity or the second entity, or both. As illustrated in FIG. 3B, the proof of relationships 320-324 may be provided within the proofs held by the vehicle. The difference between FIGS. 3A and 3B allows the first entity such as "Jeff's phone" 12 to merely provide proofs of identity such as certificates to communicate with the second entity 14. In correspondence with FIG. 3A, the proof of relationships may be provided so that the vehicle knows the groups therein. However, in FIG. 3B, the groups are known by the second entity 14 so all that is required from the first entity 12 is the proof of entity or proofs of entities 312-316.

Figure 4:
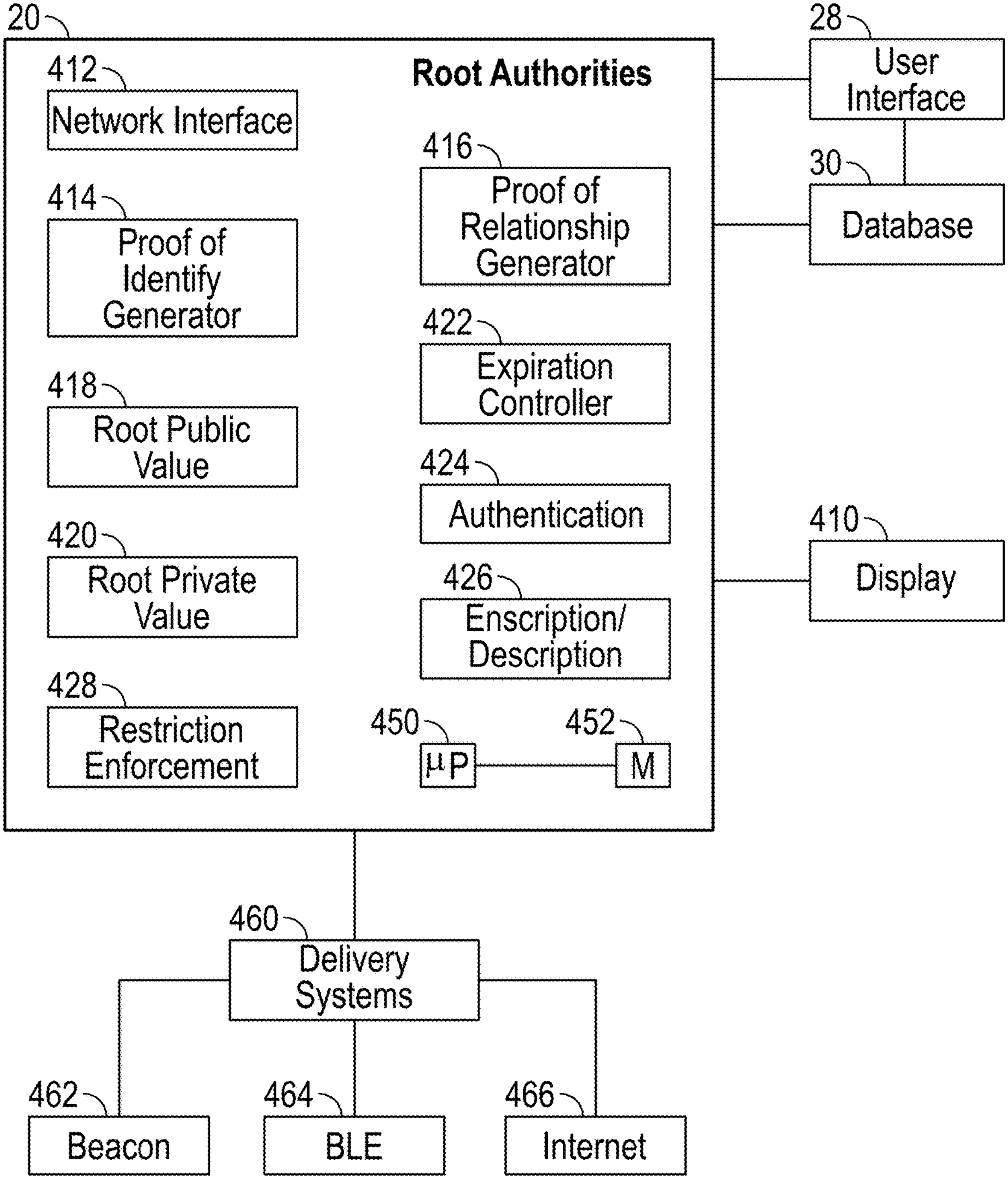
FIG. 4 is a diagrammatic view of the root authority.

Referring now to FIG. 4, the root authority 20 is illustrated in further detail. The root authority 20 has the user interface 28 and the database 30 associated therewith. In this example, a display 410 is also associated with a root authority 20 to allow interaction with the root authority 20 and provide a means for visualization and programming. For example, the display 410 may allow the various relationships such as the proofs of identity (certifications) and proofs of relationships to be formed and/or illustrated. A user may use the user interface 28 to select members of the groups that are intermediate to the first entities 12 and the second entities 14.

A network interface 412 allows the root authority to communicate with various networks and communicate proofs of identities and proofs of relationships. The proof of identity generator 414 is used for generating a proof of identity. The proof of identity generator 414 may be used to sign the public key provided from one of the entities 12, 14. A proof of relationship generator 416 generates the proofs of relationships by associating the devices with various groups as illustrated in FIG. 2. The proof of relationship generator 416 may sign the proof of relationship before providing them to the entities 12, 14. The signing is performed with the root private key or the private keys of optional intermediate certificate authorities which signed the certifications 314, 334.

The root authority 20 also has a root public value 418 that may be referred to as a public key. A root private value 420 may also be included within the root authority 20. The root private value 420 may be referred to as a private key.

As briefly mentioned above, the proofs of relationships may have expiration dates. The proof of relationship generator 416 may therefore be coupled to an expiration controller 422. The expiration controller 422 may be used to control the expiration of the proof of relationships. The expiration controller 422 may have different expiration dates for different types of groups of data. As mentioned above, proof of relationships may be provided with different expirations that are selected at formation. The expirations may overlap to allow the desired accessibility for various entities. An authentication controller 424 may be used to authenticate the various entities. The various entities, such as a phone, may be authenticated in multiple ways including on the phone itself and within the root authority 20 as illustrated at the authentication controller 424. The authentication controller 424 may confirm passwords, fingerprints, user IDs and other means for authentication.

The root authority 20 may also have an encryption controller 426. The encryption controller 426 may allow encryption to be used in the communication between the various entities 12, 14. Public keys and private keys may be used in the encryption process. That is, communications may be encrypted with the public value 418 when received and the private value or key may be used to decrypt a communication. Communications from the root authority 20 may be encrypted using the public key of one of the entities 12, 14 and provided thereto.

The root authority 20 may also have a restriction enforcement controller 428. The restriction enforcement controller 428 may assess restrictions for providing proof of relationships. The restriction enforcement controller 428 may provide geographic limitations. For example, for a rental car company associated with an airport, the vehicles associated with that airport may be provided rather than the entire relationship of all of the vehicles within the company.

The root authority 20 may also include a microprocessor or processor 450 and a memory 452. The memory may be programmed to perform various functions. That is, the memory 452 may be a non-transitory computer-readable medium including machine readable instructions that are executable by the processor to perform the various functions provided by the root authority 20. The root authority 20 may be in communication with one or more delivery systems 460. In this example, a beacon 462, a low energy Bluetooth device 464 or the internet 466 are illustrated.

Figure 5:
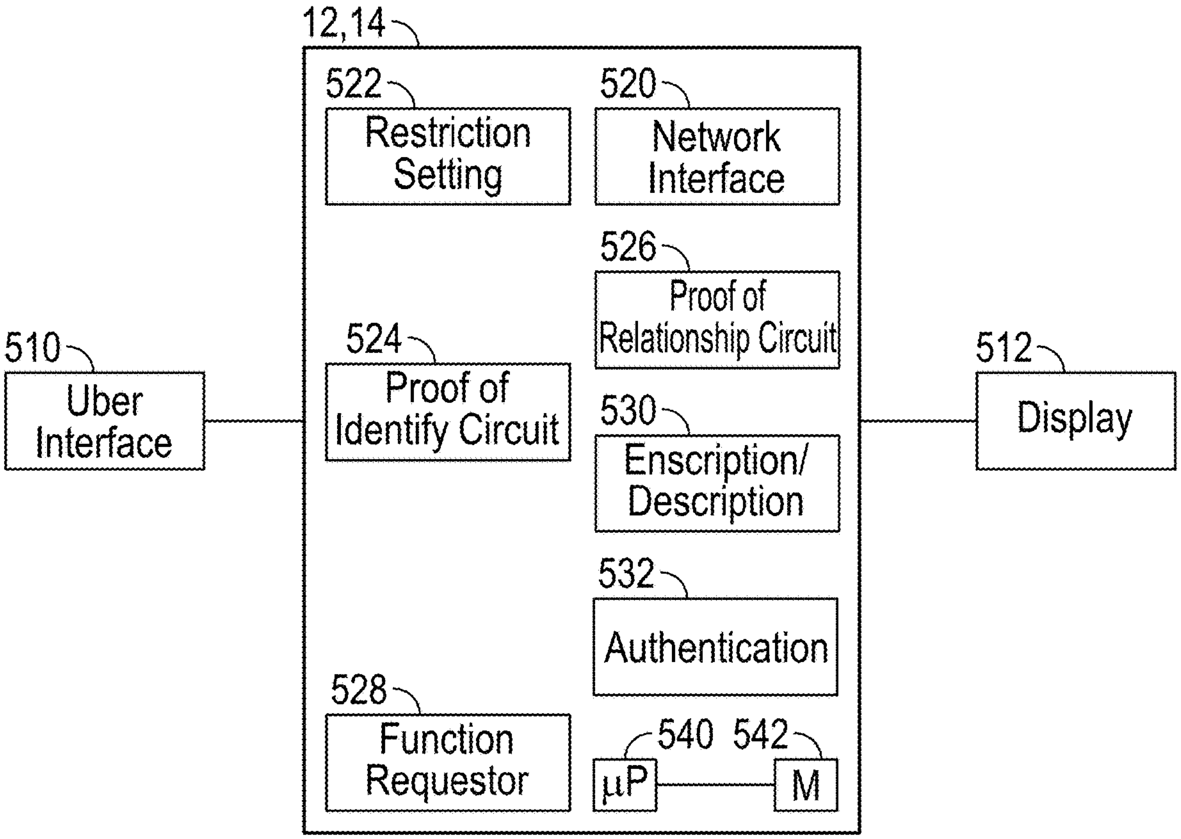
FIG. 5 is a block diagrammatic view of a generic entity.

Referring now to FIG. 5, an entity 12, 14 is illustrated in further detail. The entity 12, 14 may have a user interface 510 for providing data thereto. A display 512 is also set forth. A touch screen may be combination with a user interface 510 and a display 512. The user interface 510 may be a keyboard, touch screen, mouse, keyboard or the like. The display 512 is used for displaying various data. The entity 12, 14 may include a network interface 520 that is used for communicating to and from one of the delivery systems 460 in FIG. 4. The network interface 520 may be referred to as a modem.

The entity 12, 14 may have a restriction setting 522 corresponding to restriction of use data. That is, the restriction setting 522 corresponds to restriction of use data such geographic data, time data and purpose-of-use data. For example, global positioning data may be used if geographic restrictions are provided. Time use may prevent or authorize use during certain time periods of the day. The restrictions in the restriction settings 522 may allow a reduced data set of proofs of relationships to be communicated with the entities 12, 14 within a certain area. Further, the restriction settings 522 may prevent operation of a vehicle, for example, when the vehicle is outside a certain geographic area, such as outside of a staging area or airport or prevent operation for an unauthorized purpose-of-use.

The entity 12, 14 may also include a proof of identity circuit 524. The proof of identity circuit 524 may allow exchange between the entity 12, 14 and the root authority 20 so that proof of identity may be provided and obtained at the entity 12, 14. Likewise, a proof of relationship circuit 526 may be used to obtain and generate the proof of relationship as mentioned above. A function requestor circuit 528 may be used to enable or disable a function based upon the group and/or the proofs provided. That is, the function requestor circuit 528 may be a comparator that compares the identification or authorization of an entity with the membership within a group to enable or disable a particular function. In one example, an identifier may be provided from a first entity and a comparison of membership within one of the groups may allow a second entity to unlock a door of vehicle or start a vehicle. The communications between the entities may also be performed using encryption or decryption circuit 530. The encryption/decryption circuit 530 allows encryption and decryption to take place between the entities and the root authority 20.

An authentication circuit 5342 allows the entities 12, 14 to be authenticated. The authentication circuit 532 may allow some authentication at the first entity 12, the second entity or at the root authority 20. An example of authentication at the entities 12, 14 may be fingerprint, facial recognition or the like. An exchange of a user identifier and/or password may take place between the entities 12, 14 and the root authority 20.

The entities 12, 14 may include a microprocessor or processor 540 and a memory 542. The processor may be used to execute various commands and instructions. The memory is a non-transitory computer-readable memory that stores the commands that are executed by the processor 540.

Figure 6:
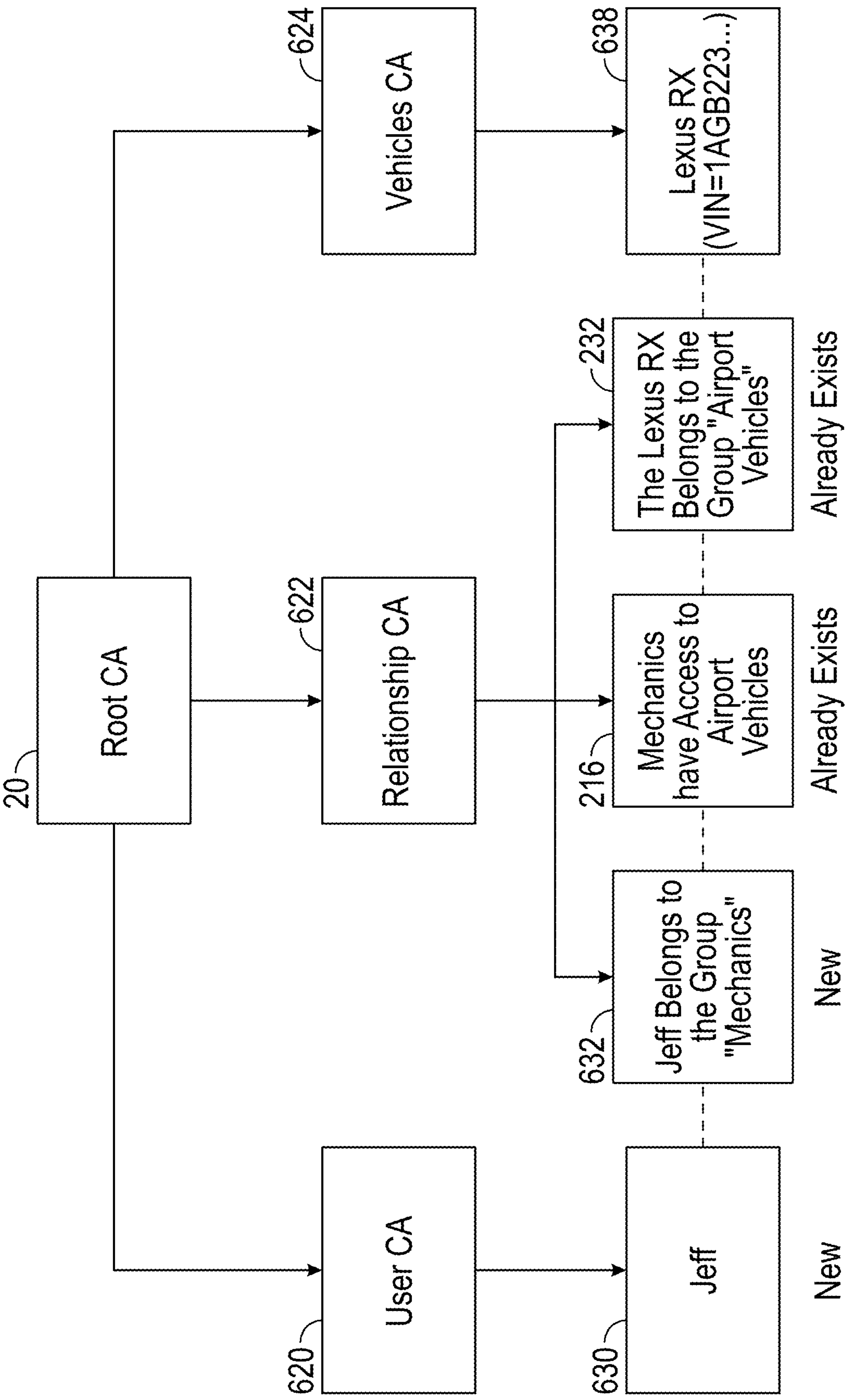
FIG. 6 is a diagrammatic view of a root authority with user, relationship and vehicle authorities.

Referring now to FIG. 6, a block diagrammatic view of a way to add a user to the system is set forth. FIG. 6 corresponds roughly to FIG. 2 and the interconnections thereof. The root authority 20 may have a user authority 620 associated therewith. A relationship authority 622 may also be associated with the root authority 20. A vehicle authority 624 may also be in communication with the root authority 20. The user authority 620 includes a group of users such as the user devices on the left side of FIG. 2. User Jeff's phone 630 is added to the user authority 620. The relationship authority 622 adds Jeff to the group mechanics. The mechanics have access to the mechanics group 216 and the "Lexus RX" below to the airport vehicles group 232. The vehicle authority 624 has the Lexus RX vehicle 638 as part thereof. Because Jeff's phone 630 is part of the mechanics group and mechanics have access to all of the vehicles at the airport, Jeff has access to the Lexus RX. The access may be to drive the vehicles 638 within the confines of the airport or have unlimited access to drive the vehicle and open the vehicle. As can be seen, it is easy to provide access to Jeff to the mechanics group and therefore the mechanics group has access to the airport group. One benefit of the system is that any number of group-based users can access the same vehicle without updating the vehicle's information. The users can provide all necessary proof of identity and group-based authorization at the time the user approaches the vehicle. Proof is signed by the cloud-based service logics so that the vehicle can authenticate it offline. Therefore, no live interconnection is a requirement.

Figure 7:
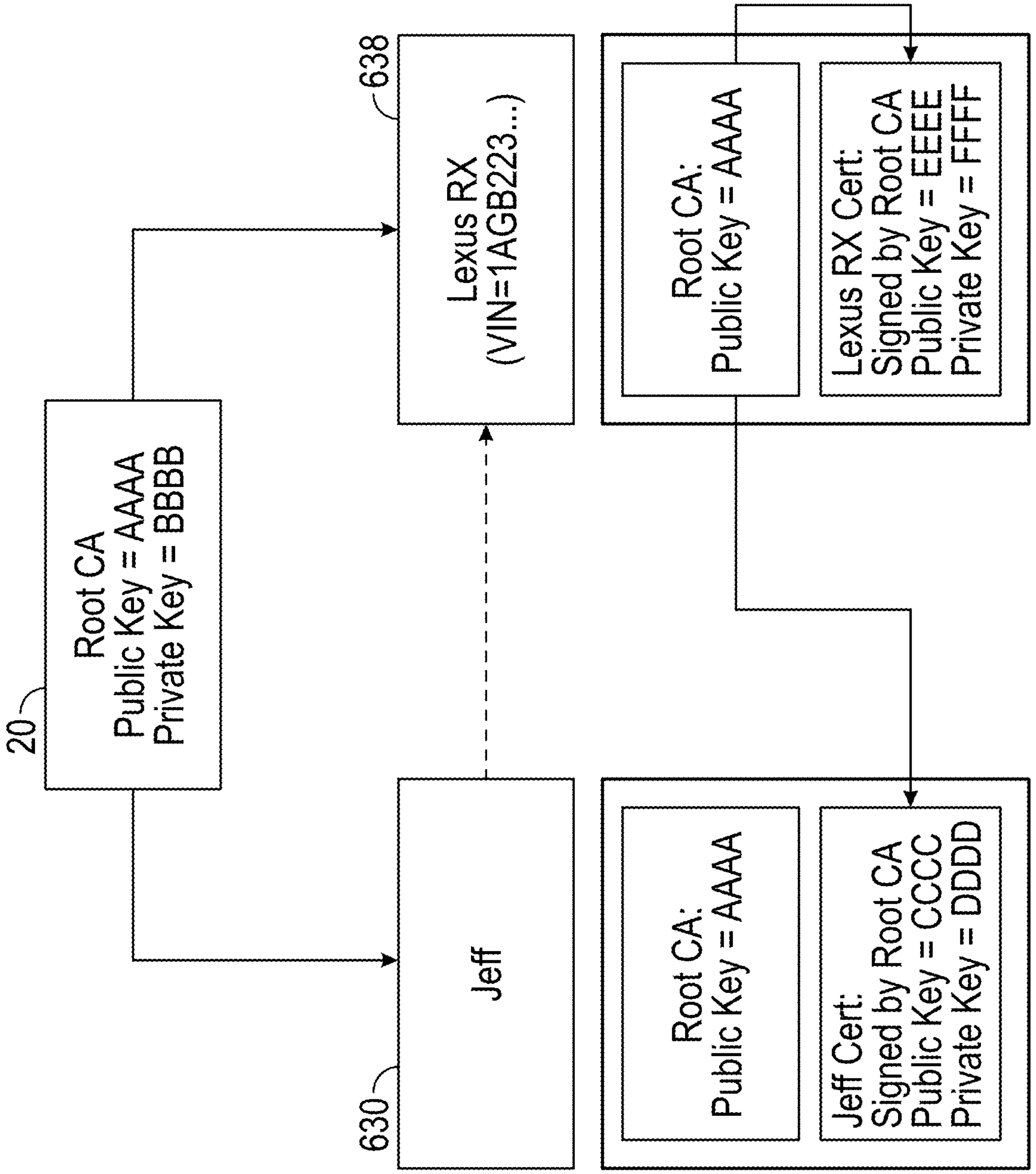
FIG. 7 is a diagrammatic view of the intercommunications of the first entity and second entity relative to the proof of identities.

Referring now to FIG. 7, the root authority 20, the first entity Jeff 630 and the Lexus RX as a vehicle 638 is provided. In this example, the establishment of interconnection between Jeff and his mobile device 630 and the Lexus RX or vehicle 638 is set forth. As illustrated, the root authority 20 has a public key AAAA and a private key BBBB. Jeff or his mobile device 630 has the public key AAAA from the root authority 20 communicated thereto. The mobile 630 has a signed root and a public key CCCC and a private key DDDD. The vehicle 638 or a second entity has a public key AAAA from the root authority and a signed root from the root authority 20. A public key EEEE and a private key FFFF are stored in the vehicle 638. To initiate the communication between the phone 630 of Jeff and the vehicle 638, Jeff's phone uses public key EEEE, the transmission thereto. Vehicle 638 decrypts the certificate stack using the private key FFFF. The vehicle uses the public key AAAA to confirm that the root authority signed Jeff's certificate 20. That is, a signal is communicated using the public key for encryption while the private key is used to decrypt the message received at the root authority 20. Once confirmation is received by the vehicle, the vehicle initiates encrypted communication using the public key CCCC of the mobile device 630. Decryption at the mobile device is performed by the private key DDDD. In this manner, the intercommunications of the vehicle 630A and the phone 630 of Jeff can communicate and therefore access may be allowed according to the permissions.

Figure 8:
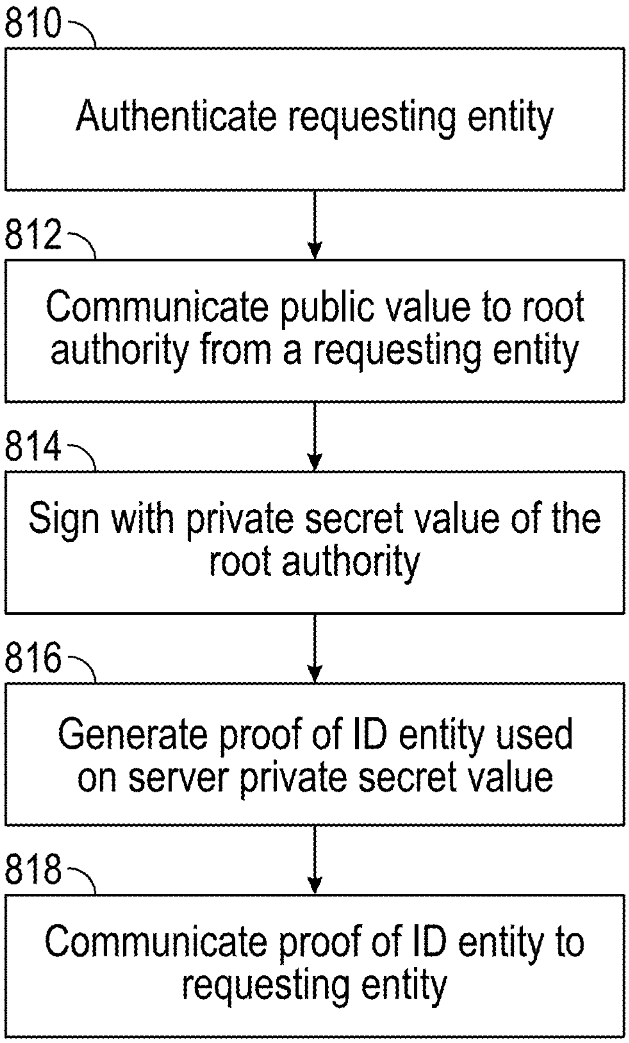
FIG. 8 is a flowchart of a method for generating proof of identity.

Referring now to FIG. 8, a method providing a proof of identity to a requesting entity is set forth. In this example, the requesting entity may be the first entity or the second entity mentioned above. In step 810, the requesting entity is authenticated. The requesting entity may be authenticated in one or a combination of different ways. The authentication circuit illustrated in the root authority 20 and/or the entities 12, 14 may be used. Some authentication methods include authentication using fingerprints, facial recognition at the requesting entity and providing a password or other security from the requesting entity to the root authority.

In step 812, a public value, such as public key, is communicated from the requesting entity to the root authority. In step 814, the private secret value of the root authority is used to sign the public value from the requesting entity. In step 816, a proof of identity based upon the server private secret value and the signing is generated. This may also be referred to as a certificate. In step 818, the proof of identity is communicated to the requesting entity. The requesting entity may store the certificate which may have an infinite expiration date or a regulated expiration date. As illustrated in FIGS. 3A and 3B, various types of certificates or proof of identities may be provided from the different authorities. The root authority may also have a user authority, a relationship authority and vehicle authority associated therewith. Each may generate a proof of identity ultimately used to provide secure communication. After proof of identity, encryption and decryption may be performed.

Figure 9:
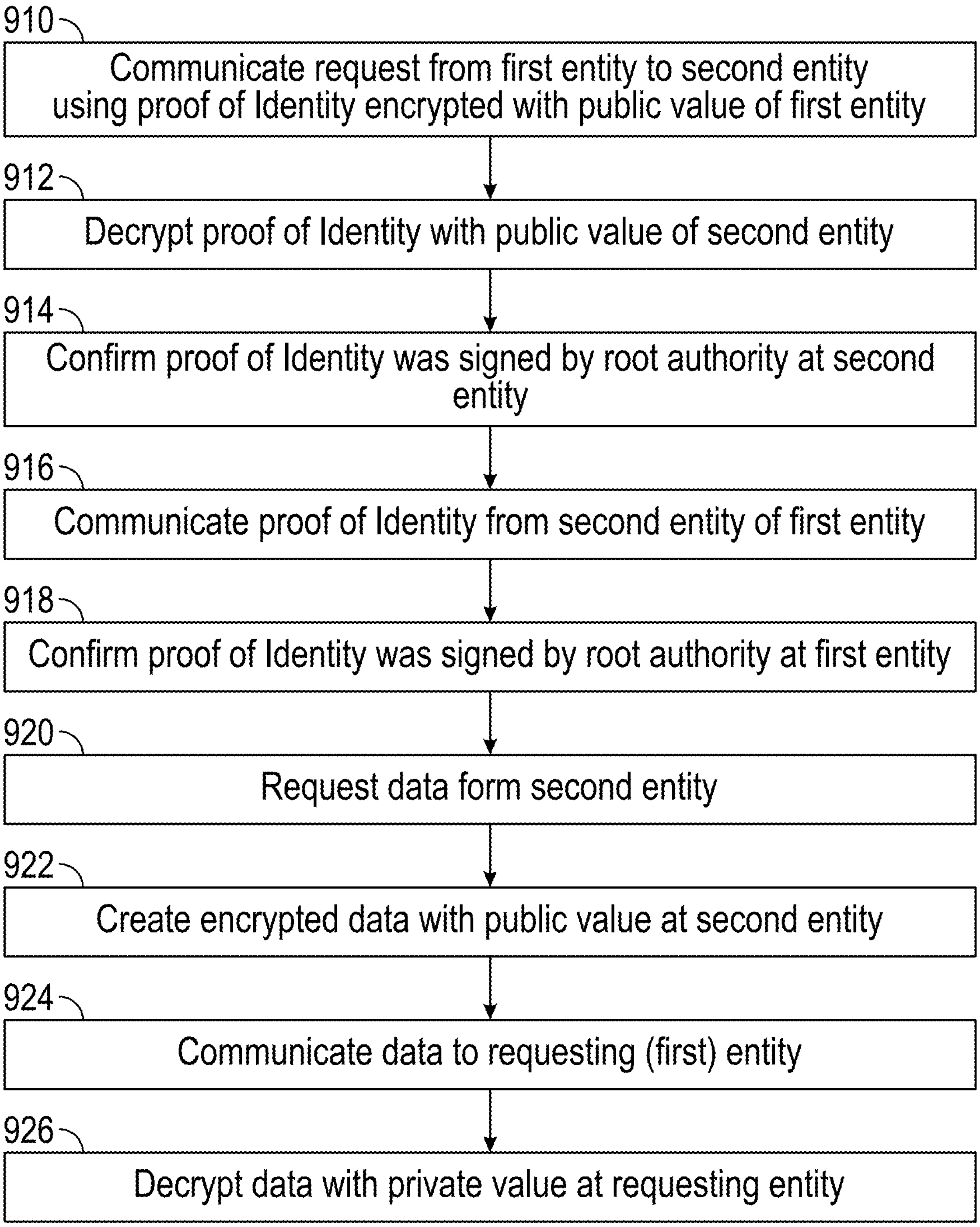
FIG. 9 is a flowchart of a method for confirming proof of identity and intercommunicating between two entities.

Referring now to FIG. 9, a method for communicating between different entities is set forth. This process presumes that certificates have already been created and stored at each of the entities. In step 910, a request from a first entity to a second entity using a proof of identity encrypted with the public key of the first entity is provided. The proof of entity may be one or more proofs of identities such as those illustrated at 312, 314, and 316 of FIG. 3A. The number of proofs of identity may be referred to as a stack. In step 912, the proofs of identity or stack is decrypted with the public value of the second entity. As mentioned above, the public value may be referred to as a public key. In step 914, the root public value is used to confirm that the root authority signed the proof of identity. By using the public key of the root authority. It is the private key of the root authority that must sign the certificates from the first entity to ensure only the root authority is capable of doing it.

In step 916, the proof of identity from the second entity is communicated to the first entity. In step 918, the first entity confirms that the root authority signed the proof of identity. Because both the first entity confirmed the second entities, proof of identity was signed by the root authority and the second entity confirmed that the first proof of identity was signed by the root entity, a trusted relationship between the first entity and the second entity is formed. Data may then be exchanged. For example, in step 920, data may be requested from the second entity using the first entity. In step 922, the data may be encrypted with the public key of the first entity. In step 924, the data may be communicated to the requesting entity. In step 926, the data received at the first entity may be decrypted using the private value at first or the requesting entity. Data may be exchanged in a similar manner between the first entity and the second entity in that the private values of each entity are used to decrypt the values from the other entity encrypted with the public keys of that entity.

Figure 10:
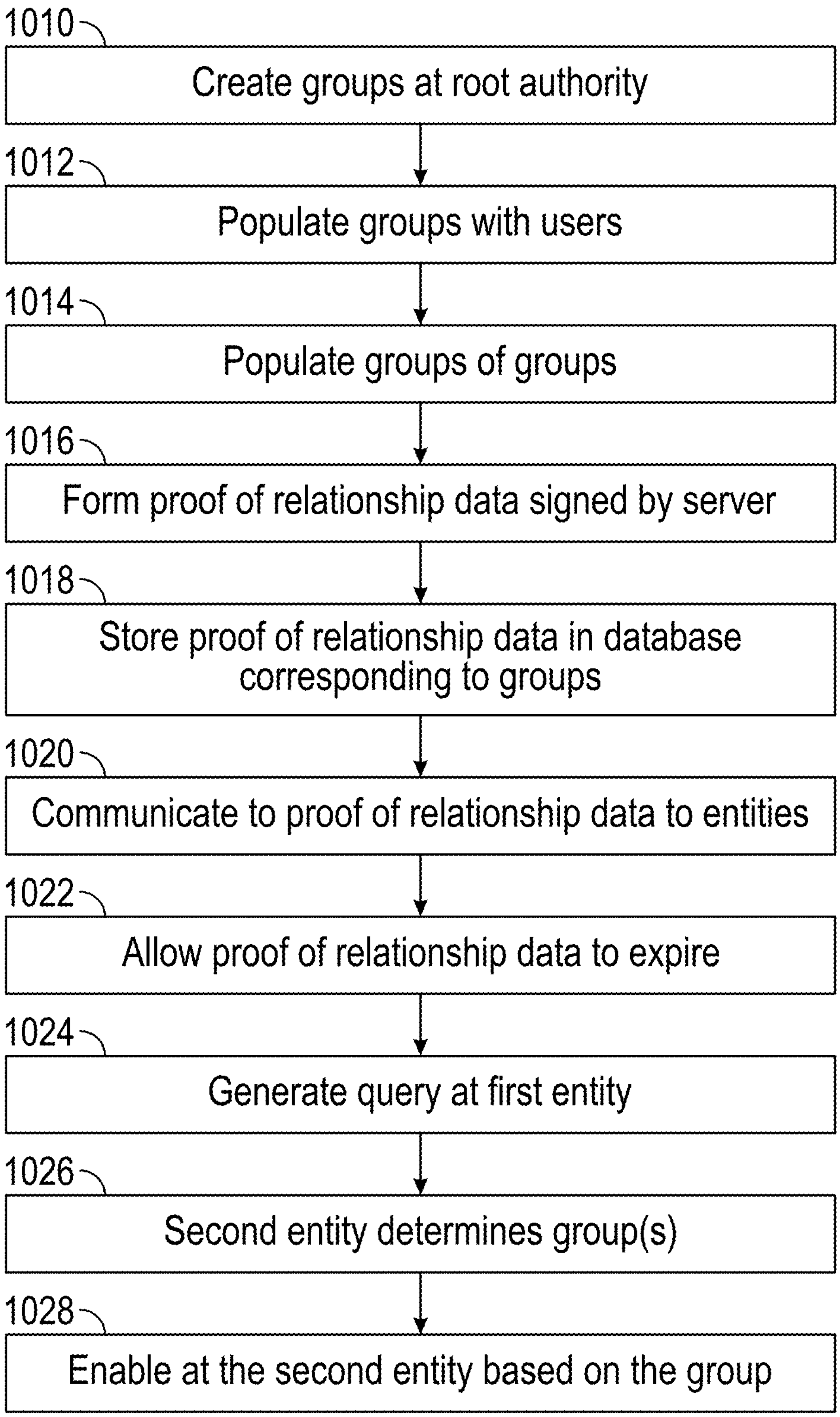
FIG. 10 is a flowchart of a method for communicating functions based upon the proof of authorities.

Referring now to FIG. 10, a way to use groups is set forth. In step 1010, the groups are created at the root authority or at another type of entity such as an enterprise entity. The groups are populated with users in step 112. In step 1014, some groups may be populated by other groups and individual users. This is performed in step 1014. In step 1016, the group relationships are signed by the server for use. The proof of relationships may correspond to the lines between the groups and the entities illustrated in FIG. 2. In step 1018, the proof of relationship data may be stored in a database corresponding to the groups. In step 1020, the proofs of relationships are communicated to the various entities. In step 1022, the proof of relationship data is allowed to expired. That is, when the proof of relationship data is established. In step 1024, a query is generated at a first entity. In step 1026, the second entity may have or may receive from the first entity, the group or groups to which the first entity belongs. Ultimately, when the first entity belongs to certain groups, functions are enabled at the second entity based on the group. It should be noted that data corresponding to the geographic or other types of limitations may be used when providing certificate data such as the proof of identity and the proof of relationships for the various entities. That is, as mentioned above, the vehicles not relative to a particular geographic area, for example, may not be provided to update the vehicle.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system comprising:

a root authority providing a first proof of identity as a first certificate signed by the root authority;

a first entity storing the first proof of identity created by the root authority;

a second entity storing a second proof of identity created by the root authority as a second certificate signed by the root authority;

the root authority generating, as server signed data distinct from the first certificate, a first proof of relationship between the first entity and a first group or role, the first proof of relationship corresponding to membership of the first entity in the first group or role and signed by the root authority;

the first entity storing the first proof of relationship and storing a second proof of relationship between the first group or role and the second entity or between the first group or role and a second group or role;

the first entity communicating the first proof of identity and first proof of relationship or role and the second proof of relationship as a first communication to the second entity;

the second entity confirms the first proof of identity was created by the root authority;

the second entity confirms the first proof of relationship or role and the second proof of relationship were created by the root authority; and based on the second entity confirming the first proof of identity and the first proof of relationship or role and the second proof of relationship, said second entity or the first entity enabling a function.

2. The system of claim 1 wherein the root authority comprising a root public value and a root private value;

the first entity having a first public value and a first private value;

the second entity having a second public value and a second private value;

the first entity communicating the first public value in a first request to create the first proof of identity;

the root authority receiving the first public value in the first request and signing the first request using the root private value to form the first proof of identity;

the root authority returning the first proof of identity to the first entity;

the second entity communicating the second public value in a second request to create the second proof of identity;

the root authority receiving the second public value in the second request and signing the second request using the root private value to form the second proof of identity; and the second entity storing the second proof of identity.

3. The system of claim 2 wherein the second entity communicates the second proof of identity in a second communication to the first entity.

4. The system of claim 3 wherein the first entity encrypts the first communication with the second public value, and wherein the second entity decrypts the first communication with the second private value.

5. The system of claim 3 wherein the second entity encrypts the second communication with the first public value, and wherein the first entity decrypts the second communication with the first private value.

6. The system of claim 1 wherein the first entity comprises a mobile device and the second entity comprises a vehicle, a point of sale device, an electronic door lock or a physical-access device.

7. The system of claim 1 wherein the first entity stores a third proof of relationship between the first group or role and one or more entities or groups.

8. The system of claim 1 wherein the first proof of relationship contains an enablement or restriction-of-use data.

9. The system of claim 8 wherein the restriction-of-use data corresponds to at least one of geographic data, time data, or purpose-of-use data.

10. The system of claim 1 wherein the first group or role comprises a plurality of entities or roles.

11. The system of claim 10 wherein the first entity stores the second proof of relationship between the first group or role and the second group or role, and stores a third proof of relationship between the second group or role and the second entity.

12. The system of claim 1 wherein the function comprises at least one of unlocking a door, starting a vehicle, accessing a terminal, enabling or disabling a device, communicating with a third entity, modifying a record, or approving a transaction.

13. A method comprising:

generating a first proof of identity at a root authority as a first certificate signed by the root authority;

storing, at a first entity, the first proof of identity created by the root authority;

storing, at a second entity, a second proof of identity created by the root authority as a second certificate signed by the root authority;

generating, at the root authority, as server signed data distinct from the first certificate, a first proof of relationship between the first entity and a first group or role, the first proof of relationship corresponding to membership of the first entity in the first group or role and signed by the root authority;

storing the first proof of relationship at the first entity and storing, at the first entity, a second proof of relationship between the first group or role and the second entity or between the first group or role and a second group or role;

communicating from the first entity the first proof of identity and first proof of relationship or role and the second proof of relationship as a first communication to the second entity;

confirming, at the second entity, the first proof of identity was created by the root authority;

confirming, at the second entity, the first proof of relationship or role and the second proof of relationship were created by the root authority;

communicating between the first entity and the second entity based on the second entity confirming the first proof of identity and the first proof of relationship or role and the second proof of relationship; and enabling a function at the first entity and the second entity based on the second entity confirming the first proof of identity and the first proof of relationship or role and the second proof of relationship.

14. The method of claim 13 further comprising:

storing, at the root authority, a root public value and a root private value;

storing, at the first entity, a first public value and a first private value;

storing at the second entity, a second public value and a second private value;

communicating, from the first entity, the first public value in a first request to create the first proof of identity;

receiving, at the root authority, the first public value in the first request and signing the first request using the root private value to form the first proof of identity;

returning the first proof of identity to the first entity from the root authority;

communicating, from the second entity, the second public value in a second request to create the second proof of identity;

receiving, at the root authority, the second public value in the second request and signing the second request using the root private value to form the second proof of identity; and storing, at the second entity, the second proof of identity.

15. The method of claim 13 wherein the first entity comprises a mobile phone and the second entity comprises a vehicle or a point of sale device.

16. The method of claim 13 wherein the first group or role comprises a plurality of entities.

17. The method of claim 14 wherein enabling the function comprises enabling at least one of unlocking a door, starting a vehicle and approving a purchase.

* * * * *